(12) United States Patent
Cousineau et al.

(10) Patent No.: US 6,265,785 B1
(45) Date of Patent: Jul. 24, 2001

(54) NON-VOLATILE OVER SPEED CONTROL SYSTEM FOR WIND TURBINES

(75) Inventors: Kevin Lewis Cousineau; Craig Leonard Christenson, both of Tehachapi, CA (US)

(73) Assignee: Zond Systems, Inc., Tehachapi, CA (US)

( * ) Notice: Subject to any disclaimer, the term of this patent is extended or adjusted under 35 U.S.C. 154(b) by 0 days.

(21) Appl. No.: 09/201,271

(22) Filed: Nov. 30, 1998

(51) Int. Cl.$^7$ ................................ F03D 9/00; H02P 9/04
(52) U.S. Cl. ................................ 290/44; 290/42; 290/43; 290/53; 290/54; 290/55
(58) Field of Search .................. 290/53–55, 42–44, 290/9; 416/23, 32, 36

(56) References Cited

U.S. PATENT DOCUMENTS

| | | | |
|---|---|---|---|
| 4,082,479 | 4/1978 | Rangi et al. | 416/9 |
| 4,105,363 | 8/1978 | Loth | 416/9 |
| 4,180,372 | 12/1979 | Lippert, Jr. | 416/9 |
| 4,247,252 | 1/1981 | Seki et al. | 416/9 |
| 4,355,955 | 10/1982 | Kisovec | 416/9 |
| 4,490,093 | * 12/1984 | Chertok et al. | 416/26 |
| 4,500,257 | * 2/1985 | Sullivan | 416/32 |
| 4,503,673 | * 3/1985 | Schachle | 60/398 |
| 4,565,929 | 1/1986 | Baskin et al. | 416/9 |
| 4,575,309 | 3/1986 | Brown | 416/9 |
| 4,613,282 | 9/1986 | Wood | 416/9 |
| 4,659,284 | 4/1987 | Wood | 416/9 |
| 4,664,596 | 5/1987 | Wood | 416/9 |
| 4,692,095 | 9/1987 | Lawson-Tancred | 416/9 |
| 4,715,782 | 12/1987 | Shimmel | 416/9 |
| 4,792,700 | * 12/1988 | Ammons | 290/55 |
| 5,278,773 | 1/1994 | Cousineau . | |
| 5,354,175 | 10/1994 | Coleman et al. . | |
| 5,422,826 | 6/1995 | Cousineau . | |
| 5,527,151 | 6/1996 | Coleman et al. . | |
| 5,527,152 | 6/1996 | Coleman et al. . | |
| 5,570,859 | 11/1996 | Quandt . | |

* cited by examiner

*Primary Examiner*—Elvin Enad
(74) *Attorney, Agent, or Firm*—Blakely, Sokoloff, Taylor & Zafman LLP

(57) ABSTRACT

A method and apparatus for non-volatile overspeed protection is described. The present invention provides a method and apparatus for non-volatile overspeed detection to provide turbine rotational speed safety during a power outage. In one embodiment, aerodynamic braking is used to slow rotation of a rotor of the wind turbine. If an overspeed condition continues after application of aerodynamic braking, mechanical braking is used to reduce the rotational speed of the rotor. Power is supplied by a non-volatile power source to continue overspeed detection during a power outage. A low-pressure trigger valve is used to apply a mechanical brake when hydraulic pressure in the braking system falls below a predetermined threshold.

15 Claims, 4 Drawing Sheets

NON-VOLATILE OVER SPEED CONTROL SYSTEM FOR WIND TURBINES

FIELD OF THE INVENTION

The present invention relates to wind turbines. More particularly, the present invention relates to overspeed protection for wind turbines.

BACKGROUND OF THE INVENTION

Utility grade wind turbines (i.e., wind turbines designed to provide electrical power to a utility grid) typically include a "fail-safe" mechanical braking system that is applied in the absence of electrical power in the utility grid, or excessively fast rotation of the turbine hub (overspeed). However, for wind turbines having large rotors (e.g., 30 or more meters in diameter), application of a mechanical brake results in structural loads to the turbine blades, the gear box and the tower. These structural loads shorten the useful life of the wind turbine.

One braking solution is aerodynamic braking of the turbine by pitching the blades of the turbine to reduce rotational speed of the hub. Aerodynamic braking reduces structural loads applied to components of the wind turbine when power is provided by the utility grid. However, when power is not supplied by the utility grid, the mechanical fail-safe braking system is applied to stop rotation of the wind turbine. In an environment where utility grid interruptions are common, caused by, for example, multiple power outages, poor line conditions, or other interruptions, frequent use of the mechanical braking system can shorten the useful life of a wind turbine.

What is needed is a braking system for a wind turbine that applies a mechanical brake for overspeed conditions during short power outages and not automatically upon loss of power.

SUMMARY OF THE INVENTION

A method and apparatus for a non-volatile overspeed protection for wind turbines is described. The wind turbine includes a sensor coupled to sense a rotational speed of a hub and a braking system to reduce the rotational speed of the hub when activated. A control circuit is coupled to the sensor and to the braking system to activate the braking system if the rotational speed of the hub exceeds a predetermined rotational speed during a predetermined time period after external power supplied to the wind turbine is lost. A low-pressure trigger valve activates the braking system when hydraulic pressure in the braking system falls below a predetermined threshold. In one embodiment, a non-volatile power supply provides power to the control circuit in the absence of external power.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

A method and apparatus for non-volatile overspeed protection for wind turbines is described. In the following description, for purposes of explanation, numerous specific details are set forth in order to provide a thorough understanding of the present invention. It will be apparent, however, to one skilled in the art that the present invention can be practiced without these specific details. In other instances, structures and devices are shown in block diagram form in order to avoid obscuring the present invention.

The present invention provides a method and apparatus for non-volatile overspeed detection to provide turbine rotational speed safety during a power outage. In one embodiment, aerodynamic braking is used to slow rotation of a rotor of the wind turbine. If an overspeed condition continues after application of aerodynamic braking, mechanical braking is used to reduce the rotational speed of the rotor. Power is supplied by a non-volatile power source to continue overspeed detection during a power outage. A low-pressure trigger valve is used to apply a mechanical brake when hydraulic pressure in the braking system falls below a predetermined threshold.

Figure 1:
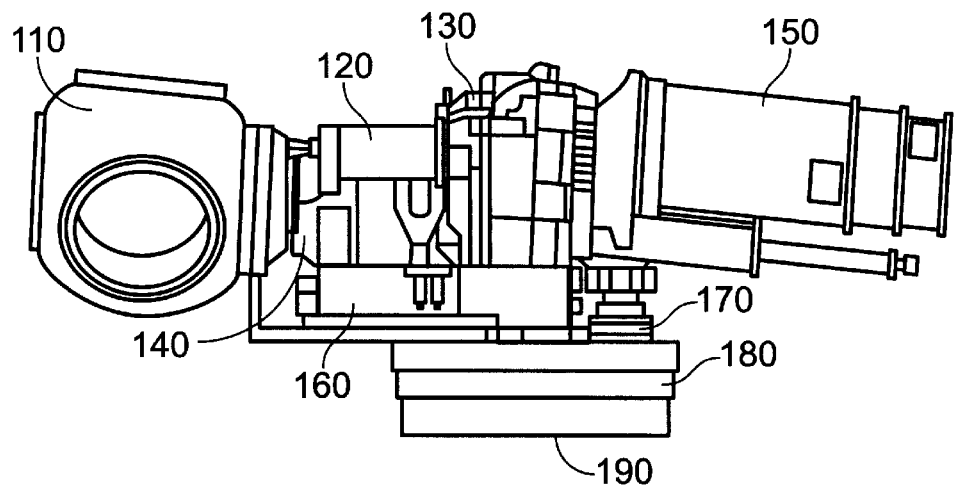
FIG. 1 is one embodiment of wind turbine components.

FIG. 1 is one embodiment of wind turbine components. The components of FIG. 1, except for hub 110, are housed in a nacelle (not shown in FIG. 1) atop tower 190. The wind turbine of FIG. 1 describes additional feature and/or components that are not necessary to practice the present invention. For example, the present invention does not require a variable pitch controller.

In one embodiment, wind turbine components 100 include a distributed microcontroller based control system. In such an embodiment, multiple microcontrollers (not shown in FIG. 1) are used for overall system monitoring and control including pitch and speed regulation, high-speed shaft and yaw brake application, yaw and pump motor application and fault monitoring. Alternative distributed or centralized control architectures can also be used.

In one embodiment the control system provides aerodynamic braking capability through variable blade pitch controller 120 and mechanical braking capability with a mechanical braking system including brake 130. In one embodiment, the control system also controls pitch and yaw, as described in greater detail below.

Hub 110 is designed to receive multiple turbine blades (not shown in FIG. 1) that cause the hub to rotate as a result of wind. In one embodiment, hub 110 receives three blades; however, any number of blades can be used. Hub 110 and the turbine blades combine to form a wind turbine rotor.

Brake 130 is part of a dynamic mechanical fail-safe system that is described in greater detail below. Drive train 140 includes a main shaft connected to hub 110 and a gear box that, in one embodiment, utilizes a dual path geometry to drive a high speed shaft enclosed within the gear box. The high speed shaft is used to drive generator 150.

In one embodiment, generator 150 is a high efficiency, 6-pole, doubly-fed generator that is flange mounted on the rear of the gearbox. In one embodiment rotor torque is transmitted through a torque limiting coupling (not shown in FIG. 1). Hydraulic power unit 160 is part of a hydraulic mechanical braking system that is described in greater detail below. Other types of generators, for example, wound motor induction generators can also be used.

Yaw drive 170 and yaw deck 180 provide a yaw control system for the wind turbine. In one embodiment, the yaw system is electrically operated and controlled by the control system based on information received from a wind vane (not shown in FIG. 1) mounted on the nacelle. In one embodiment, the yaw system consists of a yaw deck is made of ductile iron, a slewing ring with an inside gear, two electrical yaw drive units, and an adjustable friction system to dampen the yaw movements. In one embodiment, the yaw system is mounted on a cylindrical flange provided at the top of tower 190.

Figure 2:
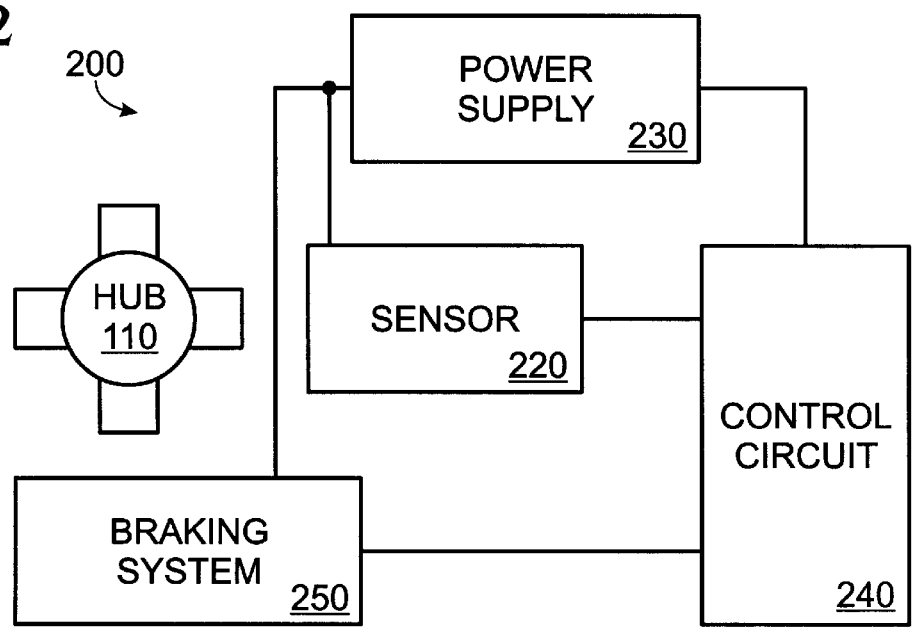
FIG. 2 is one embodiment of a block diagram of a wind turbine overspeed detection and braking system.

FIG. 2 is one embodiment of a block diagram of a wind turbine overspeed detection and braking system. Hub 110 of FIG. 2 represents, in block diagram form, hub 110 of FIG. 1.

In one embodiment, hub 110 is designed to operate in conjunction with sensor 220 to allow sensor 220 to determine the rotational speed of hub 110. Sensor 220 determines the rotational speed of hub 110 mechanically, optically, or by any other appropriate method. Control circuit 240 is coupled to sensor 220 to monitor the rotational speed of hub 110. In an alternative embodiment, sensor 220 can be configured to determine the rotational speed of other wind turbine components such as, for example, a generator shaft. Control circuit 240 controls braking system 250 based, at least in part, on the output of sensor 220. In one embodiment, control circuit 240 is a microcontroller and supporting circuitry.

Power supply 230 provides power to sensor 220, to control circuit 240, and to braking system 250. In one embodiment, power supply 230 includes both a primary power source and a secondary power source, with respect to the wind turbine. Under normal operating conditions, power is supplied by the primary power source, such as a utility power grid. When power is not available from the primary power source, power is supplied from the secondary power source, such as a battery, a capacitor, or other non-volatile power supply.

Figure 3:
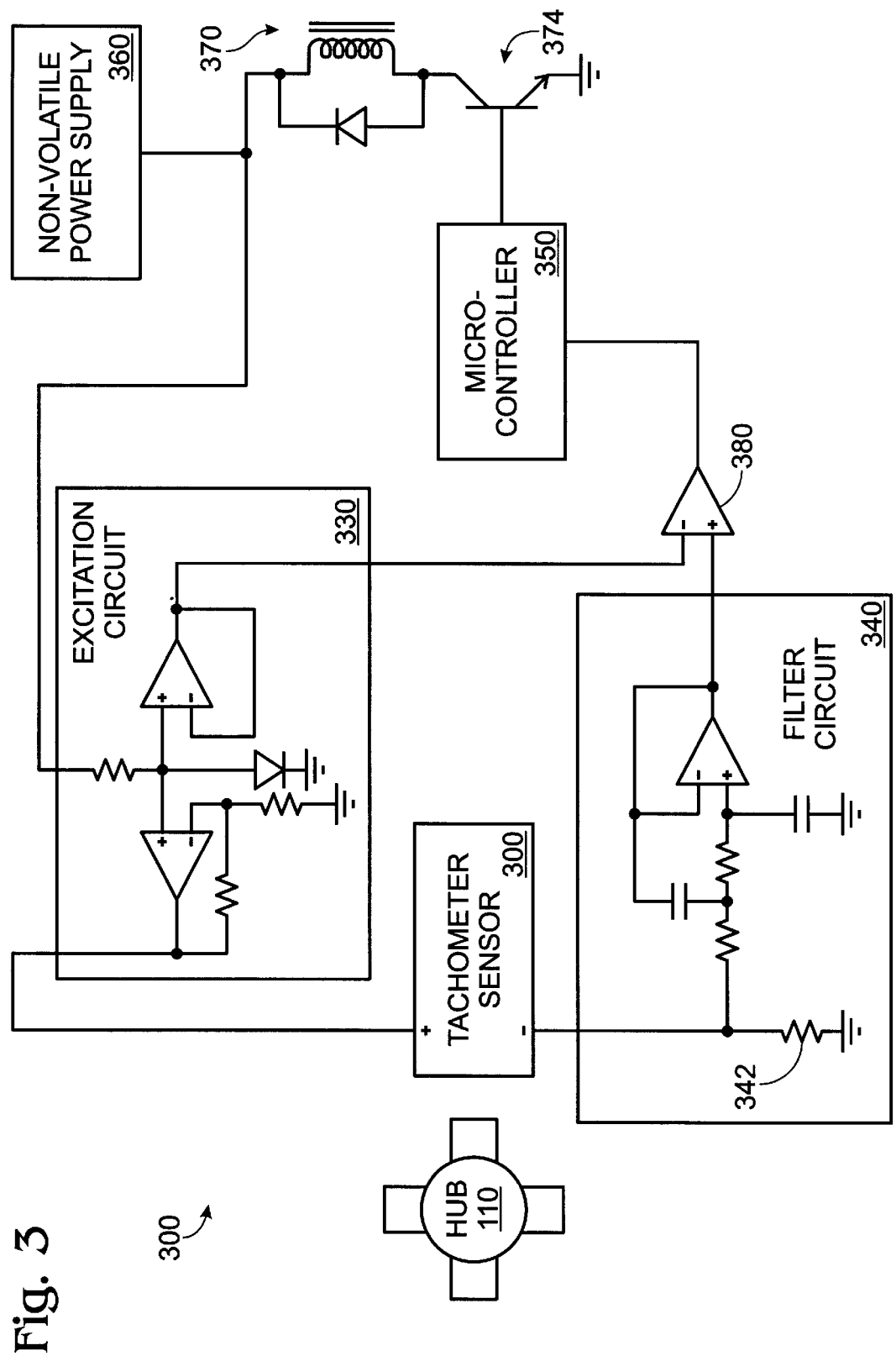
FIG. 3 is one embodiment of an overspeed detection and braking system.

FIG. 3 is one embodiment of an overspeed detection and braking system. Hub 110 represents a hub as in FIGS. 1 and 2. Tachometer sensor 320 determines the rotational speed and/or number of rotations of hub 110. Excitation circuit 330 provides supply current to tachometer sensor 320 and filter circuit 340 receives output signals from tachometer sensor 320.

FIG. 3 illustrates one embodiment of excitation circuit 330 and filter circuit 340; however, other excitation and filter circuits can also be used as well as other tachometer sensor configurations. Excitation circuit 330 provides an input current to tachometer sensor 320 and a reference voltage level to comparator 380. Tachometer sensor 320 outputs a current proportional to the rotational speed of hub 110. Resistor 342 of filter circuit 340 provides a voltage level that is proportional to the current output by tachometer sensor 320. Filter circuit 340 outputs a voltage level that approximates a square wave (e.g., a rounded square wave) with a duty cycle that is proportional to the rotational speed of hub 110.

Comparator 380 receives the output voltage from filter circuit 340 and the reference voltage from excitation circuit 330 and generates a square wave signal having a duty cycle that is proportionate to the rotational speed of hub 110. In this manner, comparator 380 provides rotational speed information to microcontroller 350 with a duty cycle encoded signal. Alternatively, another output encoding scheme can be used, such as signal period encoding, or frequency encoding.

In alternative embodiments microcontroller 350 is replaced by another device, such as a processor, a state machine, hardwired logic, etc. In one embodiment, microcontroller 350 is coupled to transistor 374 to control solenoid 370. Alternatively, solenoid 370 can be controlled by a level amplifier or other device.

As described in greater detail below, solenoid 370 controls pressure in a hydraulic braking system. However, other control mechanisms can be used. Also, non-hydraulic braking systems can be used to provide mechanical braking. In one embodiment, transistor 374 is a power transistor capable of carrying the relatively high current required to control the hydraulic braking system with solenoid 370.

Non-volatile power supply 360 provides power to the components of FIG. 3. In one embodiment, non-volatile power supply 360 is used to provide power to the components of FIG. 3 in order to provide overspeed protection for a predetermined period of time (e.g., one minute) after external power is lost. In one embodiment, power is stored in a 0.3 Farad capacitor. Other capacitors can also be used based on the current requirements of the system and the period of time during which the system is to be powered up by non-volatile power supply 360.

During the predetermined period of time in which non-volatile power supply 360 provides power to the components of FIG. 3, aerodynamic and/or mechanical braking can be used in response to an overspeed condition. Because overspeed conditions that cannot be prevented by aerodynamic braking generally occur during a short period of time after external power to the wind turbine is lost, non-volatile power supply 360 provides power for a relatively short period of time to apply wind turbine brake 560.

Figure 4A:
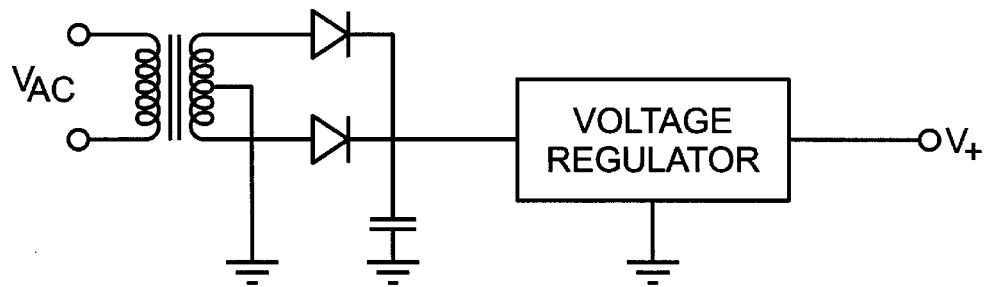
FIGS. 4a–4c is various embodiments of non-volatile power supplies suitable for use with present invention.
Figure 4B:
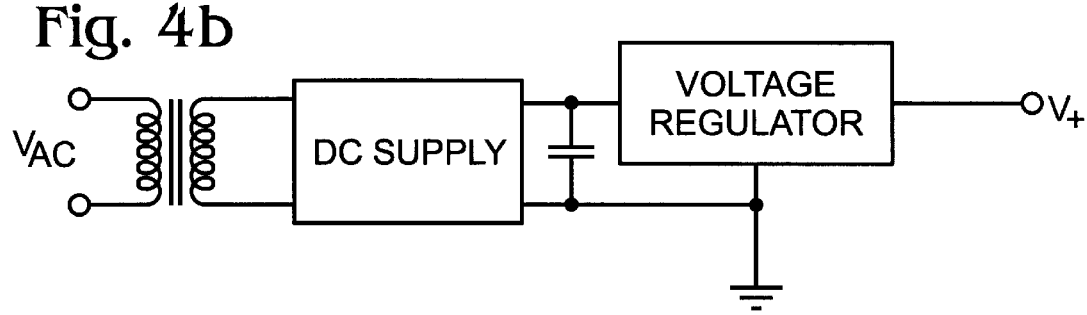
Figure 4C:
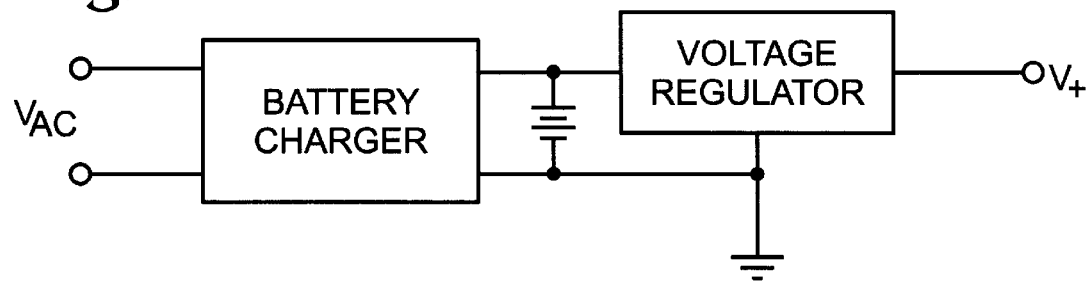

FIGS. 4a–4c are various embodiments of non-volatile power supplies suitable for use with the present invention. FIG. 4a is a first embodiment of a non-volatile power supply storing power in a capacitor. FIG. 4b is a second embodiment of a non-volatile power supply storing power in a capacitor. FIG. 4c is one embodiment of a non-volatile power supply storing power in a battery.

Figure 5:
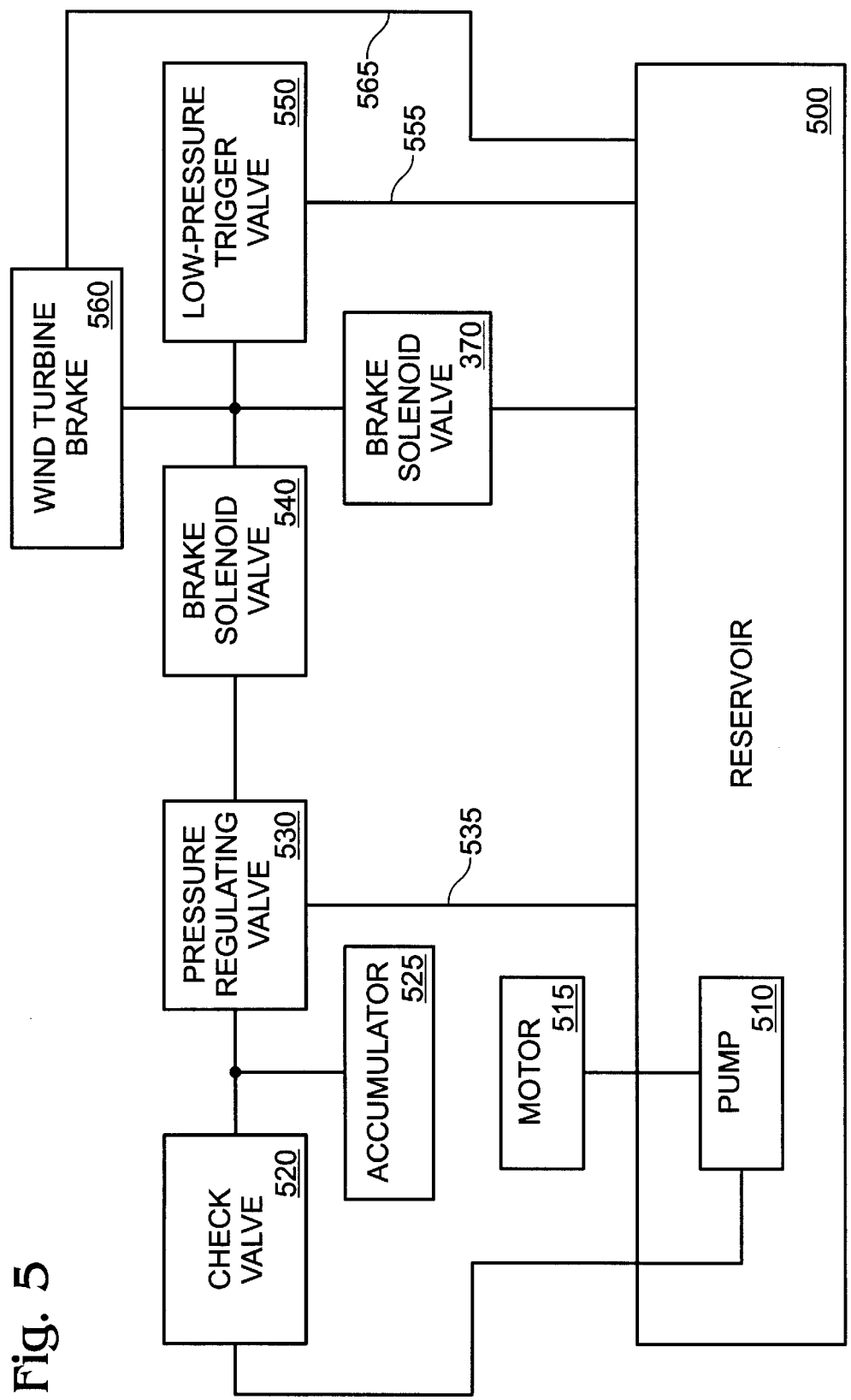
FIG. 5 is one embodiment of a hydraulic braking system.

FIG. 5 is one embodiment of a hydraulic braking system. The braking system of FIG. 5 is designed for use with a pressure released, spring applied mechanical brake to slow rotation of a wind turbine hub.

Reservoir 500 stores hydraulic fluid for use with the braking system of FIG. 5. Motor 515 is controlled by a control circuit (not shown in FIG. 5) to operate pump 510. Pump 510 pumps hydraulic fluid from reservoir 500 through check valve 520 and into the braking system. Check valve 520 prevents hydraulic fluid from flowing back into reservoir 500.

Accumulator 525 stores hydraulic pressure for use in the braking system. Pressure regulating valve 530 regulates pressure in the braking system and bleeds off hydraulic fluid via line 535 to reduce pressure when necessary. In one embodiment, brake solenoid valves 540 and 370 are controlled by voltage levels generated by a control circuit (not shown in FIG. 5). Brake solenoid valve 540 prevents flow of hydraulic pressure when not energized and allows hydraulic pressure to flow when energized. Brake solenoid valve 370 similarly prevents flow of hydraulic pressure when not energized and allows hydraulic pressure to flow when energized.

Low-pressure trigger valve 550 monitors pressure within the braking system and allows hydraulic fluid to flow back to reservoir 500 via line 555 when pressure in the braking system drops below a predetermined threshold. In one embodiment low-pressure trigger valve 550 is a "velocity fuse" available from Parker-Hannifin Corporation of Elyria, Ohio. Low-pressure trigger valve 550 can be used, for example, to reduce pressure in the braking system to cause wind turbine brake 560 to be applied when the pressure in the braking system is such that pads of wind turbine brake 560 would touch the brake disk. Line 565 allows hydraulic fluid to be returned to reservoir 500 from wind turbine brake 560.

Because low-pressure trigger valve 550 does not require power to operate, low-pressure trigger valve 550 can be used provide non-volatile braking. Over time the components of the braking system that include valves lose pressure as the result of leaks. When power is not available to operate motor 515 and pump 510 to maintain pressure in the braking system, overall system pressure decays. As the hydraulic system pressure in the braking system decays, wind turbine brake 560 is slowly applied until the pads of wind turbine brake 560 touch the brake disk. In one embodiment the pressure at which the brake pads touch the disk, or are close to touching the disk, is used as a threshold pressure at which low-pressure trigger valve 550 releases pressure from the braking system thereby applying wind turbine brake 560 to stop rotation of the wind turbine hub.

Under normal operation when brake solenoid valve 540 is energized and brake solenoid valve 370 is not energized the pressure maintained by the braking system is sufficient to offset the force of the springs that apply wind turbine brake 560 to prevent wind turbine brake 560 from slowing or stopping rotation of the wind turbine hub. Thus, wind causes the turbine hub to rotate and drive the wind turbine generator.

When the wind turbine is in standby mode the hub is slowed or stopped by aerodynamic braking. In one embodiment, the blades of the wind turbine rotor are pitched to an angle of 90 degrees with respect to the wind. Thus, hub rotation can be substantially slowed or stopped without applying a mechanical brake that causes structural loads to the components of the wind turbine. When the wind turbine is in standby mode brake solenoid valve 540 is energized and brake solenoid valve 370 is not energized.

When wind turbine brake 560 is applied, for example, for an emergency stop caused by a system failure, or for a normal overspeed condition when power is available from the utility grid, brake solenoid valve 540 is not energized and brake solenoid valve 370 is energized. Hydraulic fluid is then prevented from flowing into wind turbine brake 560 by brake solenoid valve 540 and hydraulic fluid is drained back to reservoir 500 through brake solenoid valve 370 to reduce hydraulic pressure in wind turbine brake 560.

When power is lost from the utility grid, power to brake solenoid valve 540 is lost and brake solenoid valve 540 is not energized. This prevents hydraulic fluid from flowing through brake solenoid valve 540. Brake solenoid valve 370 is not energized when power from the utility grid is lost; however, power is available from the non-volatile power supply as described in greater detail below. Because brake solenoid valve 370 is not energized, pressure is maintained except for leaks in the valves of the braking system, which generally prevents wind turbine brake 560 from being applied.

As described in greater detail above, the control circuit has power supplied from the non-volatile power supply in order to continue operation for a period of time after power is lost from the utility grid. Brake solenoid 370 has power available from the non-volatile power supply through the control circuit such that brake solenoid 370 can be energized in response to an overspeed condition to cause wind turbine brake 560 to be applied. As the hydraulic system pressure maintaining the release of mechanical brake 560 decays through normal system leakage to a threshold pressure at which low-pressure trigger valve 550 opens to reduce pressure in the braking system and cause wind turbine brake 560 to be applied. Wind turbine brake 560 is then applied until power and hydraulic pressure are restored.

In an alternative embodiment at the end of a predetermined period of time, brake solenoid valve 370 is energized, which reduces hydraulic pressure in wind turbine brake 560. This causes the mechanical brake to be applied. Thus, at the end of the predetermined period of time after power is lost from the utility grid, wind turbine brake 560 is applied to stop rotation of the wind turbine hub.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A wind turbine comprising:
    a sensor coupled to sense a rotational speed of a hub;
    a braking system to reduce the rotational speed of the hub when activated;
    a control circuit coupled to the sensor and to the braking system to activate the braking system if the rotational speed of the hub exceeds a predetermined rotational speed during a predetermined period of time after external power supplied to the wind turbine is lost; and
    a low-pressure trigger valve to activate the braking system when hydraulic pressure in the braking system falls below a predetermined threshold.

2. The wind turbine of claim 1 further comprising a non-volatile power supply coupled to the sensor and to the control circuit to provide power during the predetermined time period after external power supplied to the wind turbine is lost.

3. The wind turbine of claim 2 wherein the non-volatile power supply stores power in a capacitor.

4. The wind turbine of claim 2 wherein the non-volatile power supply stores power in a battery.

5. The wind turbine of claim 1 wherein the braking system slows the rotational speed of the hub after the predetermined period of time.

6. An apparatus for monitoring and controlling hub rotational speed in a wind turbine, the apparatus comprising:
    means for providing power for a predetermined period of time to a control circuit when power from an external source is lost;
    means for detecting rotational speed of a wind turbine hub during the predetermined period of time;
    means for reducing the rotational speed of the wind turbine hub during the predetermined period of time if the rotational speed of the wind turbine hub exceeds a predetermined limit; and
    means for reducing hydraulic pressure to reduce the rotational speed of the wind turbine hub in response to predetermined hydraulic conditions.

7. The apparatus of claim 6 wherein the means for reducing rotational speed of the wind turbine comprises:
    means for aerodynamic braking during the predetermined period of time; and
    means for mechanical braking during the predetermined period of time.

8. The apparatus of claim 6 further comprising means for slowing rotation of the hub after the predetermined period of time.

9. A method of overspeed protection in a wind turbine, the method comprising:

storing power during a first time period in which power is available from a source external to the wind turbine;

using the stored power during a second time period in which power is not available from the external source to monitor rotational speed of a hub of the wind turbine, the monitoring occurring for a predetermined period of time;

slowing rotation of the hub during the predetermined period of time if the rotational speed of the hub exceeds a predetermined limit; and halting rotation of the hub by reducing hydraulic pressure in a braking system when hydraulic pressure in the braking system falls below a predetermined threshold.

10. The method of claim 9 further comprising stopping rotation of the hub at the end of the predetermined period of time if the external power source is not supplying power.

11. The method of claim 9 wherein power is stored in a capacitor.

12. The method of claim 9 wherein slowing rotation of the hub comprises releasing a pressure released, spring applied mechanical brake to slow rotation of the hub.

13. A wind turbine comprising:

a hub;

a generator connected to generate power in response to rotation of the hub;

a sensor circuit coupled to determine a rotational speed of the hub, the sensor circuit coupled to receive power from an external source when available and from a non-volatile power supply when power from the external source is unavailable;

a braking system coupled to the sensor circuit, the braking system to slow rotation of the hub in response to being activated by the sensor circuit; and a hydraulic trigger valve coupled to the braking system, the hydraulic trigger valve to allow hydraulic fluid to exit the braking system when the hydraulic pressure falls below a predetermined threshold.

14. The wind turbine of claim 13 wherein the non-volatile power supply provides power for a predetermined period of time after power from the external source is lost, and further wherein the control circuit activates the braking system at the expiration of the predetermined period of time.

15. The wind turbine of claim 13 wherein the sensor circuit activates the braking system if the rotor exceeds a predetermined rotational speed.

* * * * *